(12) United States Patent
Chen (10) Patent No.: US 6,552,856 B1
(45) Date of Patent: Apr. 22, 2003

(54) MULTI-CHANNEL WAVELENGTH LOCKER USING GAS TUNING

(75) Inventor: George C. K. Chen, Santa Clara, CA (US)

(73) Assignee: Fibera, Inc., Saratoga, CA (US)

( * ) Notice: Subject to any disclaimer, the term of this patent is extended or adjusted under 35 U.S.C. 154(b) by 0 days.

(21) Appl. No.: 09/967,436

(22) Filed: Sep. 27, 2001

(51) Int. Cl.⁷ .............. G01B 11/06; G01B 9/02; H01S 3/10
(52) U.S. Cl. .............. 359/634; 356/519; 372/20
(58) Field of Search .................. 359/634, 247, 359/260, 638, 352; 385/13, 24; 372/20, 92, 19, 61, 55; 356/519

(56) References Cited

U.S. PATENT DOCUMENTS

| | | | | |
|---|---|---|---|---|
| 3,920,983 A | * | 11/1975 | Schlafer et al. | 359/129 |
| 5,798,859 A | * | 8/1998 | Colbourne et al. | 356/454 |
| 5,828,689 A | * | 10/1998 | Epworth | 372/32 |
| 6,134,253 A | * | 10/2000 | Munks et al. | 372/23 |
| 6,276,806 B1 | * | 8/2001 | Skillicorn et al. | 359/855 |
| 2002/0163650 A1 | * | 11/2002 | May | 356/519 |

OTHER PUBLICATIONS

"Fabry–Perot Wavelength Locker (FPWL)", (actual publication date unknown, but prior to Jun. 12, 2001), 1 page, Product Data Sheet by E-TEK of San Jose, CA.

* cited by examiner

Primary Examiner—Georgia Epps
Assistant Examiner—Omar Hindi
(74) Attorney, Agent, or Firm—Raymond E. Roberts; Intellectual Property Law Offices (57) ABSTRACT

A method and system for providing wavelength-locked multi-channel signals with respect to a wavelength reference. Wavelengths of a plurality of radiation sources are introduced to at least one etalon having a gas medium. The etalon produces a plurality of equally spaced spectral lines and is tuned by varying its optical index of refraction, by varying the characteristics of its gas medium. The optical index of refraction is then fixed, by fixing the characteristics of its gas medium, and thus locking the plurality of spectral lines with respect to the wavelength reference. In particular, the etalons may be tuned by varying the pressure or composition of their gas-tunable mediums until the spectral lines of the etalon align with the ITU grid.

24 Claims, 6 Drawing Sheets

MULTI-CHANNEL WAVELENGTH LOCKER USING GAS TUNING

TECHNICAL FIELD

The present invention relates generally to multiplexing of communications signals and more particularly to the wavelength division multiplexing of optical signals in fiber optics communications.

BACKGROUND ART

Figure 1:
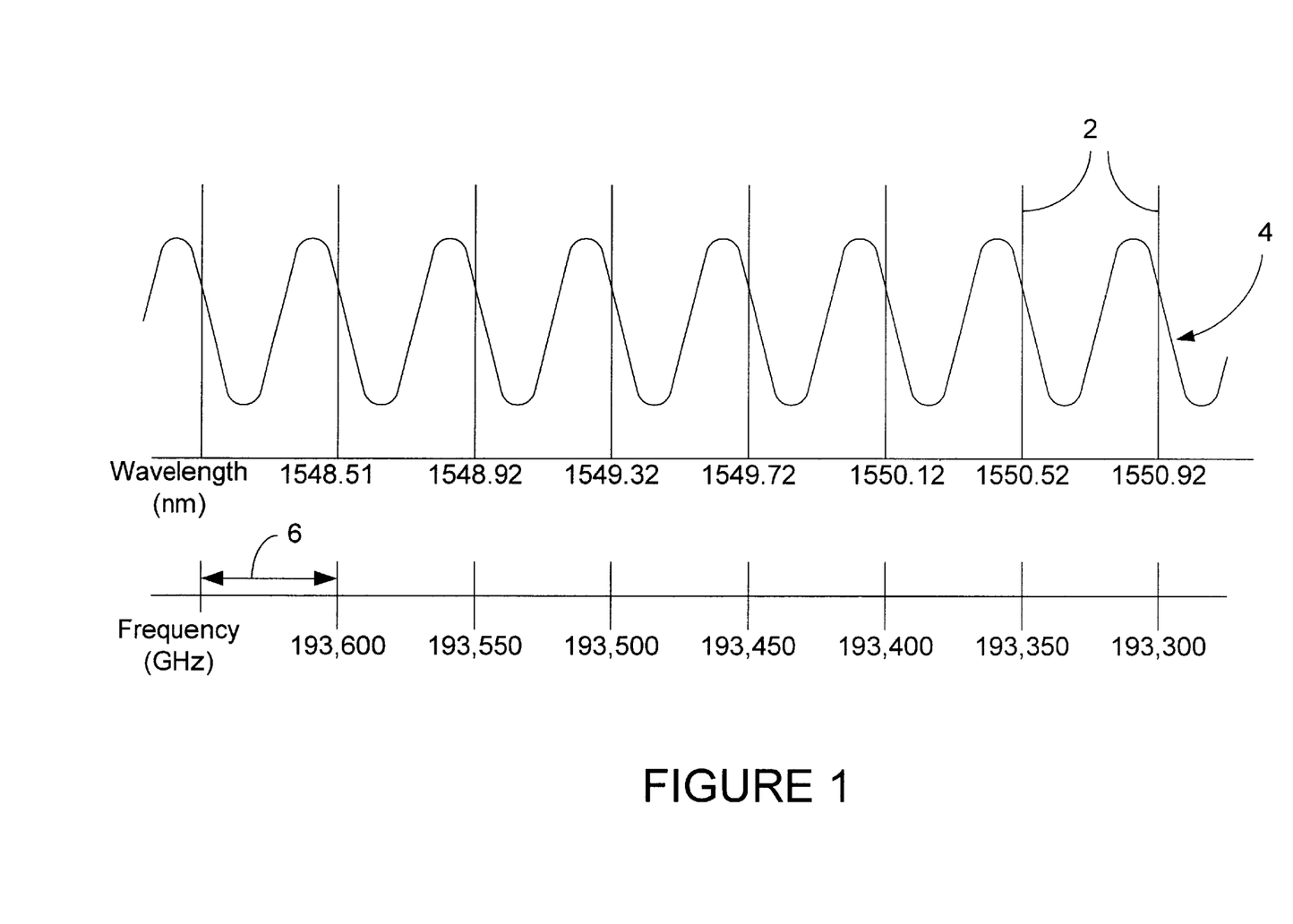
FIG. 1 shows the ITU reference grid with a spectral line pattern from a 50 GHz etalon superimposed.

Wavelength Division Multiplexing (WDM) is a way of increasing the capacity of an optical fiber by simultaneously operating at more than one wavelength within a single optical fiber. Multiple optical signals of different wavelength are transmitted in the same direction over one strand of fiber, and the signals are later separated by wavelength at the distant end. In order to establish some standards for WDM operations, the International Telecommunication Union (ITU) has proposed successive systems of standardized frequencies to be used as channels for optical telecommunications, with each system incorporating more and more channels, usually with smaller and smaller wavelength separation between the channels. This system of channels is spoken of as the "ITU grid" and currently includes 80 channels utilizing a wavelength range centered around 1550 nm (193,300 GHZ) with a channel spacing of approximately 0.4 nm (50 GHZ). An ITU grid with 50 GHZ frequency spacing is shown in FIG. 1 with the fringe order pattern from a Fabry-Perot interferometer using an etalon of appropriate parameters superimposed on the grid. There has also been a system proposed which uses channel spacing of 25 GHZ (0.2 nm). It will be easily apparent that the smaller the spacing is between channels, the more sensitive a multiplexed channel system will be to fluctuations that will cause the channel frequencies to drift away from the target grid frequencies. In a system where the frequency spacing is 100 GHz, the variation of from the grid frequency of 0.01 nm (1.2 GHz) would be undesirable, but perhaps may not be disastrous. In a 50 GHz system, a 0.01 nm variation would impair the performance of the system, and in a 25 GHz system, such a deviation would likely be disabling.

An interference filter is a type of tool that is often used to separate multiple wavelengths of light that are included in a beam of light. A Fabry-Perot Interferometer is one type of interference filter that is often used for wavelength filtering and separation. Interference filters operate by providing a pair of mirrored surfaces with a cavity formed between them. Incident light undergoes multiple reflections between the mirrored surfaces, which typically reflect greater than 95% of the light at each surface. The incident and reflected wave interfere with each other constructively or destructively depending on their phase relationship. Where there is no phase difference between successive wave, constructive interference is produced and a maximum is produced in the transmission portion. Where the phase are 180 degrees out of phase, destructive interference occurs and a minimum is transmitted. A maximum occurs when the round trip optical path is some integer multiple of whole wavelengths, and also depends on the thickness of the cavity (d), the index of refraction of the cavity material (n), and the angle of incidence ($\theta$), which are related by the formula:

$$2d\, n\, \cos\theta = m\lambda,$$

where m is an integer, often termed the order number and $\lambda$ is the wavelength of the light. The parallel rays of each wavelength are often focused by a lens in order to produce a familiar ring pattern. The result is a series of transmission peaks of separated wavelength. The separation distance between adjacent peaks is equally spaced when plotted with respect to inverse wavelength, and is called the Free Spectral Range (FSR).

Figure 2:
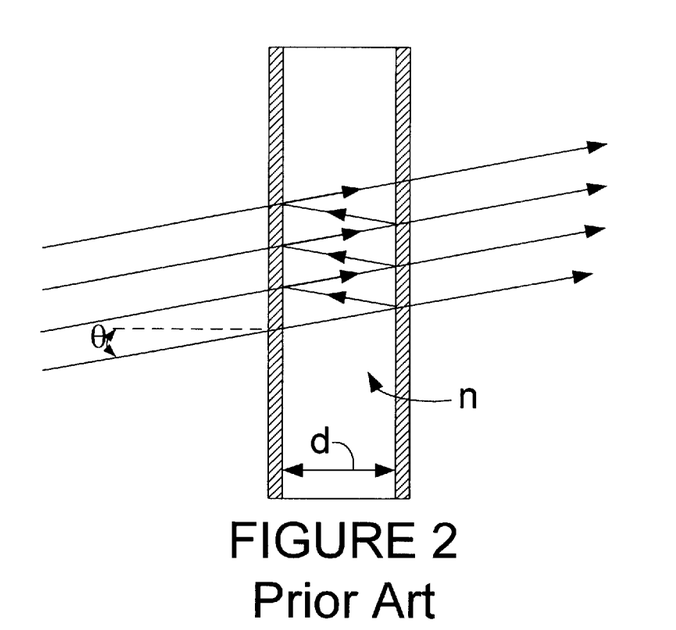
FIG. 2 illustrates an angle-tuned etalon of the prior art.
Figure 3:
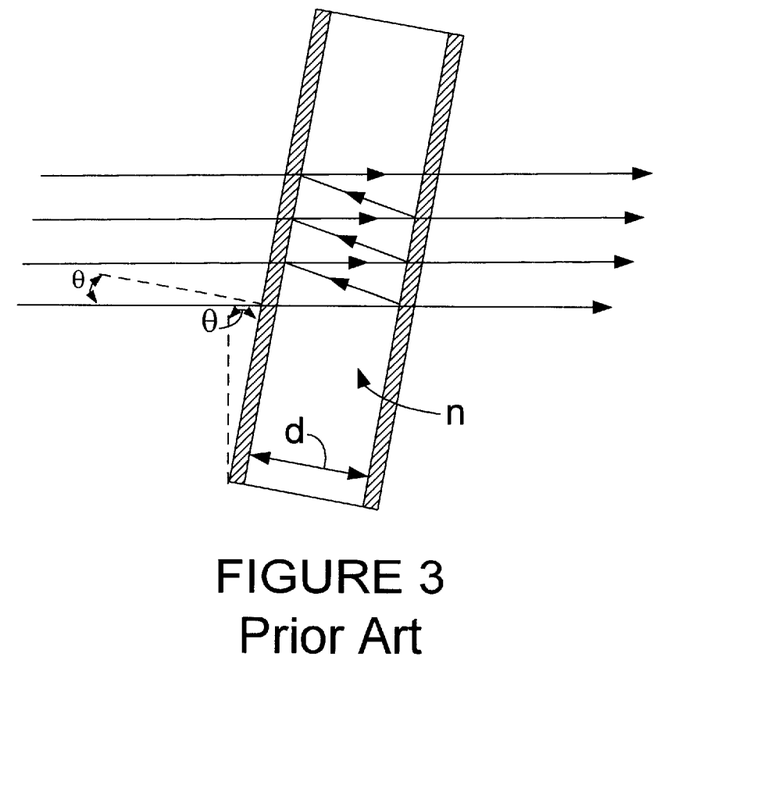
FIG. 3 shows an angle-tuned etalon of the prior art.

Etalons are special Fabry-Perot interferometers which have fixed spacing between the reflective surfaces, thus the thickness of the cavity d is therefore not subject to direct parallel variation. However, the etalon may be tilted, changing the angle of the etalon relative to the angle of incidence of the light beam, which thus increases the optical path length. This allows the etalon to be "tuned" over a limited range to alter the peak transmission wavelengths. FIGS. 2 and 3 show etalons as used in the prior art. FIG. 2 shows the incident light striking the etalon at an angle $\theta$, and FIG. 3 shows the same etalon tuned at the same angle $\theta$, thereby increasing the optical path length n to angle tune the etalon.

However, angle tuning of an etalon introduces other problems caused by the insertion loss due to the variation in angle. Besides the difficulties of producing very tiny variations in angle, when the etalon is tuned at a small angle, the output beam can become oblong in shape, with non-uniform beam intensity distribution. As this angle increases, this effect becomes more pronounced. When optics are used to collect the output light from the etalon, a large insertion loss variation is often seen. This variation is typically from 1–4 dB.

The variation of etalon insertion loss also commonly causes the operating point of the output spectrum to shift by as much as 10 pm (0.01 nm=1.2 GHz). As discussed above, errors of this magnitude can seriously interfere with operation of systems which use 25 Ghz frequency separations and even with 50 GHz systems.

Thus, there is a great need for a etalon which is usable in a multi-channel wavelength locking system which does not produce such large variations in insertion loss, beam quality, and wavelength shift.

DISCLOSURE OF INVENTION

Accordingly, it is an object of the present invention to provide a multi-channel wavelength locking system with better ITU setting repeatability.

Another object of the invention is to provide a multi-channel wavelength locking system with improved temperature stability.

And another object of the invention is to provide a multi-channel wavelength locking system which produces smaller variations in insertion loss.

A further object of the present invention is to provide a multi-channel wavelength locking system which produces smaller variations in beam quality.

An additional object of the present invention is to provide a multi-channel wavelength locking system which produces less wavelength shift.

Yet another object of the present invention is to provide a multi-channel wavelength locking system which can be used with wavelengths which are separated by as little as 25 GHz or less.

A yet further object of the present invention is to provide a tunable etalon which has reduced manufacturing costs due to more relaxed dimensional tolerances in the parts.

Briefly, one preferred embodiment of the present invention is a wavelength locker for providing wavelength-locked multi-channels signals, including a number of radiation sources providing beams of radiation at wavelengths separated by a predetermined spacing, each spaced wavelength being a channel which is connected to a multiplexer. One or more wavelength lockers produce equally-spaced spectral lines which are tunable wavelength locker includes one or more etalons which includes a gas-tunable medium having a variable optical index of refraction. The etalons may either be transmissive, or reflective with respect to which surface the major portion of the light exits. The etalons are tuned by varying the pressure or composition of the gas-tunable medium until the spectral lines of the etalon align with the ITU grid. The gas properties are then fixed by at least temporarily sealing the etalon enclosure.

In use in a multi-channel system, beam splitters divert a portion of the beams of radiation into the wavelength lockers. Detectors then receive the spectral line output of the wavelength lockers and detects shifts in wavelength of the spectral line output to generates control signals. The wavelength of each of the radiation sources is then adjusted in response to the control signals.

The output of the detector may also be normalized in order to isolate the variations which are attributable to shift in wavelength. The channels may be sequentially sampled and the outputs adjusted by a single wavelength locker or there may be separate wavelength lockers for each input channel.

A method for locking the wavelengths of a plurality of radiation sources to a wavelength reference is also included.

An advantage of the present invention is that it provides improved ITU setting repeatability.

Another advantage of the present invention is that it provides improved temperature stability.

And another advantage of the present invention is that it produces very small variations in insertion loss and beam quality.

A further advantage of the present invention is that it can be used with wavelengths which are separated by as little as 25 GHz or less.

A yet further advantage is that the present invention can provide a tunable etalon which has reduced manufacturing costs due to more relaxed dimensional tolerances in the parts.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which.

BEST MODE FOR CARRYING OUT THE INVENTION

A preferred embodiment of the present invention is a multi-channel wavelength locker which uses gas tuning to align the output of a multi-channel device with the ITU reference grid. As illustrated in the various drawings herein, and particularly in the view of FIG. 4, a form of this preferred embodiment of the inventive device is depicted by the general reference character 10 and will be referred to as wavelength locker 10. It should also be understood that, the speed of light being a constant in a specified medium, when the wavelength of radiation is locked, the frequency of that radiation is necessarily locked as well. Thus, although it is possible to speak of the present invention as a wavelength/frequency locker" or "frequency locker", for ease of reference in this application, the present invention will be called a wavelength locker 10.

As discussed above, the International Telecommunication Union (ITU) has proposed systems of standardized frequencies to be used as channels for optical telecommunications, with each system incorporating more and more channels, usually with smaller and smaller wavelength separation between the channels. This system of channels is spoken of as the "ITU grid" and currently includes 80 channels utilizing a wavelength range centered around 1550 nm (193,300 GHZ) with a channel spacing of approximately 0.4 nm (50 GHZ). An ITU grid 2 with 50 GHZ frequency spacing 6 is shown in FIG. 1 with the spaced spectral lines 4 from a Fabry-Perot interferometer using at etalon of appropriate parameters superimposed on the grid. The peaks of the spectral line pattern 4 are intentionally off-set from the ITU grid lines 2 so that any drift toward greater wavelength (to the right in the figure) will be sensed as an increase in power, and a shift to the lower wavelength (to the left) will be sensed as a decrease.

Also as discussed above, a Fabry-Perot Interferometer is one type of interference filter that is often used for wavelength filtering and separation. Interference filters operate by providing a pair of mirrored surfaces with a cavity formed between them. Incident light undergoes multiple reflections between the mirrored surfaces, which typically reflect greater than 95% of the light at each surface. The incident and reflected waves interfere with each other constructively or destructively depending on their phase relationship. Where there is no phase difference between successive wave, constructive interference is produced and a maximum is produced in the transmission portion. Where the phase are 180 degrees out of phase, destructive interference occurs and a minimum is transmitted. A maximum occurs when the round trip optical path is some integer multiple of whole wavelengths, and also depends on the thickness of the cavity (d), the index of refraction of the cavity material (n), and the angle of incidence ($\theta$), which are related by the formula:

$$2 d n \cos\theta = m \lambda$$

where m is an integer, often termed the order number and $\lambda$ is the wavelength of the light. The parallel rays of each wavelength are often focused by a lens in order to produce a familiar ring pattern. The result is a series of transmission peaks of separated wavelength, which are shown in FIG. 1 as the spaced spectral lines 4.

Figure 4:
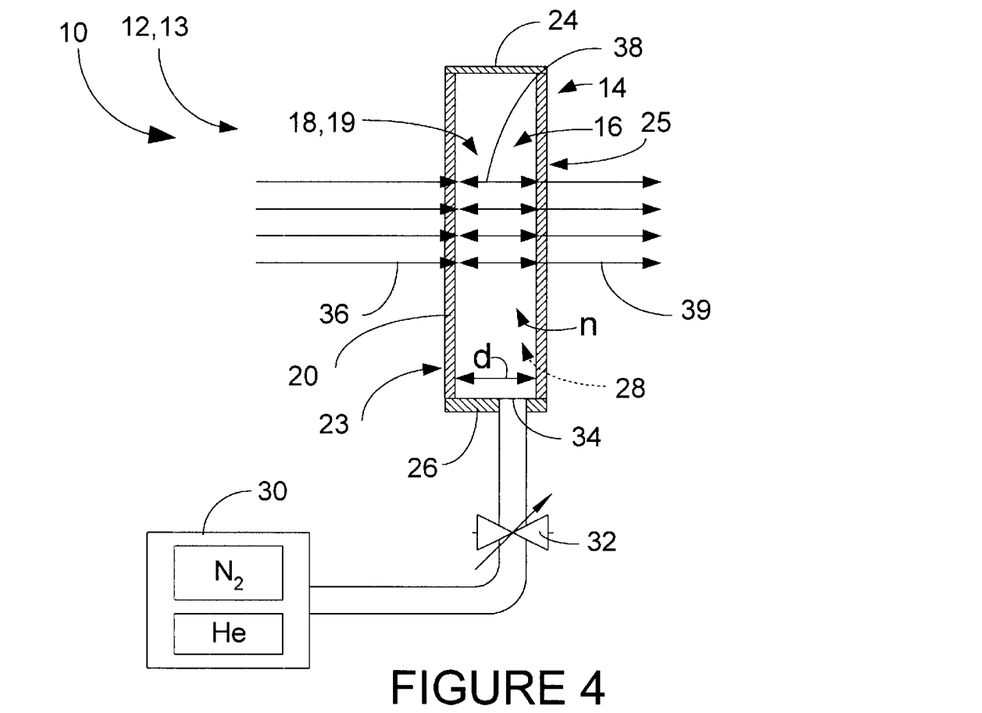
FIG. 4 illustrates a gas-tuned etalon of the present invention, which is a transmissive etalon.

A gas-tuned etalon 12 of the wavelength locker 10 of the present invention is shown in FIG. 4. The etalon 12, is a Fabry-Perot interferometer 13, and generally includes an enclosure 14, which surrounds a cavity 16. This cavity 16 includes a medium 19 of variable index of refraction, which is preferably a tuned gas 18, whose pressure or composition has been tuned to produce the appropriate index of refraction, as discussed below. The etalon 12 includes a first reflecting surface 20, a second reflecting surface 22, top wall 24, bottom wall 26, and side walls 28 to complete a gas-tight enclosure 14. The etalon 12 is connected to a gas source 30 which provides gas of variable composition and pressure through a valve 32. The etalon 12 also includes an inlet 34, which is preferably sealable in a gas-tight manner. The second reflecting surface 22 in this embodiment is at least a partially transmissive surface 25, so that the spectral line pattern seen in FIG. 1 is produced on the opposite side of the etalon 12 from the input. This form of etalon shall be termed a transmissive etalon 31.

Figure 5:
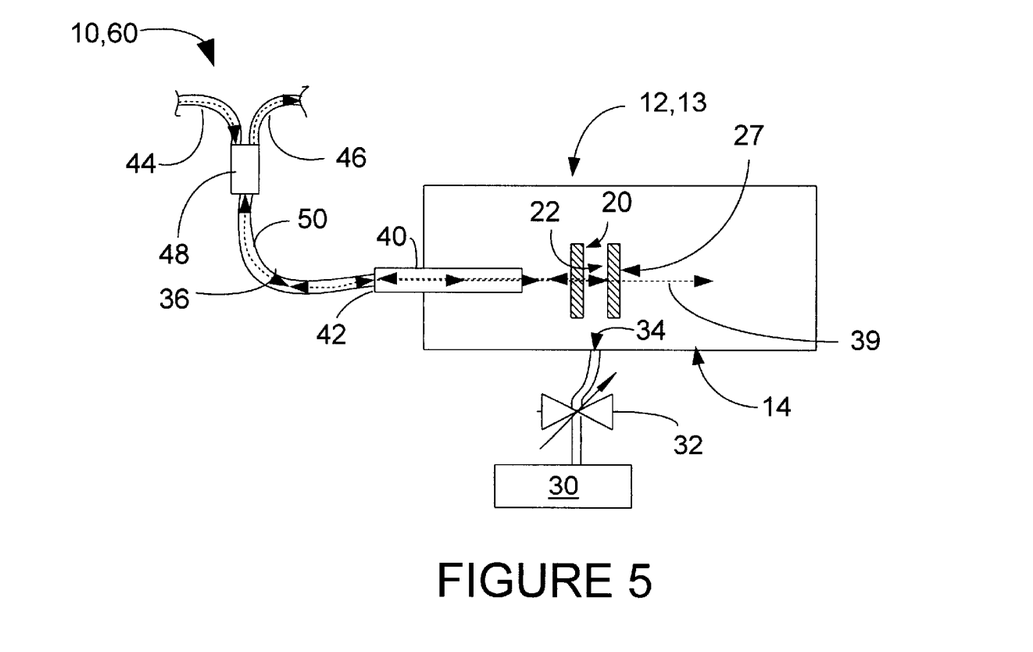
FIG. 5 illustrates a gas-tuned etalon of the present invention, which is a reflective etalon.

FIG. 5 shows second embodiment 60 which includes a variation in the structure of the etalon 12, in which the light beam is mostly reflected, with a small fraction remaining as a transmitted beam 39. The reflected beam will preferably be at least 65% of the total beam, with 35% being transmitted. This form of etalon, in which the spectral line pattern is produced on the input side, shall be termed a reflective etalon 29, although it is understood that a portion of the light will also be transmitted. The incident light beam 36 continues through the input fiber 44 into a 2×2 coupler 48 and then into the fiber 50. The incident beam 36 continues into a collimator 40, and is preferably aligned to all normal to the surface of the etalon 12. The light interferes through reflection within the etalon 12, and is mostly returned into the collimator 40 as a reflected light beam 38. The residual beam 33 which passes through the second surface 22 may be captured by a beam dump or left to scatter on the wall of the enclosure 14. If the etalon is configured with the proper spacing and material index of refraction, interference notches are formed at regular intervals whose separation corresponds to ITU grid frequency.

In either of these embodiments, the enclosure 14 can enclose the etalon 12 directly with the first and second reflecting surfaces 20, 22 acting as part of the enclosure 14, or these surfaces my be included in a larger enclosure which may include one or more etalons.

In operation, incident light beams 36 approach the etalon 12 at substantially normal incidence, and are internally reflected as reflected beams 38, and interfere with the incident light beams 36 to create an interference pattern which produces spectral lines 4 (see FIG. 1)

The spectral line pattern 4 can be adjusted to align with the ITU grid pattern by changing either cavity thickness (d), index of refraction (n), or angle ($\theta$) in the formula 2 d n cos$\theta$ m $\lambda$. The thickness of the etalon is difficult to manipulate in manufactured components, and it is undesirable to change the angle, due to problems with walk-off of the beam, and distortion of the beam shape. The present inventor has taken the assertedly novel approach of varying the index of refraction (n) by tuning the properties of the material within the cavity 16. By using a medium of variable index of refraction 19 such as a gas, varying either the pressure or the composition of the gas in the cavity 16 will change the index of refraction (n), thus allowing the etalon 12 to be tuned, and the spectral lines 4 aligned with the ITU grid 2. The gas composition is preferably 90% N and 10% He but may he varied to increase the index of refraction by increasing the N concentration, or to decrease the index of refraction by decreasing it.

The pressure in the etalon 12 will of course vary slightly with temperature as the incident light beam heats the gas in the cavity, however the inventor expects that this effect will be minimal, on the order of $10^{-8}$ $\Delta$d/d (change in length per unit of length of etalon surface separation). It is preferred that the etalon 12 will generally not be actively tuned by the user while in operation. The pressure and/or gas composition will preferably be set at the time of manufacture, and the etalon enclosure 14 sealed before shipment to the ultimate user. However, it is possible that for certain applications where very fine adjustment of the reference output is required, that the etalon 12 may be actively tuned by the user, and that there may be a mechanism included to vary the pressure, perhaps by making precise adjustments in the etalon temperature and/or varying the gas composition. In this case, the enclosure inlet 34 may have only a temporary seal, which will then be occasionally opened and closed to allow variations in pressure or composition.

The present wavelength locker 10 is made by a method of providing an etalon enclosure 14 which includes two mirrored surfaces, and charging the cavity 16 with gas of appropriate pressure until the correct index of refraction (n) is achieved. The cavity 16 is then sealed to maintain this correct index of refraction (n).

A major advantage of this method of production is that the physical tolerances on the etalon parts can be much less strict than would otherwise be necessary. In order to achieve an accuracy of 1 GHz in matching the ITU frequencies, parts would have to be made within a tolerance of 0.10 nm ($1\times10^{-9}$ m). Instead, by allowing the gas filler material in the cavity to be adjusted in pressure or composition, variations in the physical parts can be relaxed to tolerances of only 1 $\mu$ ($1\times10^{-6}$m) thus resulting in devices which are much less expensive.

Figure 6:
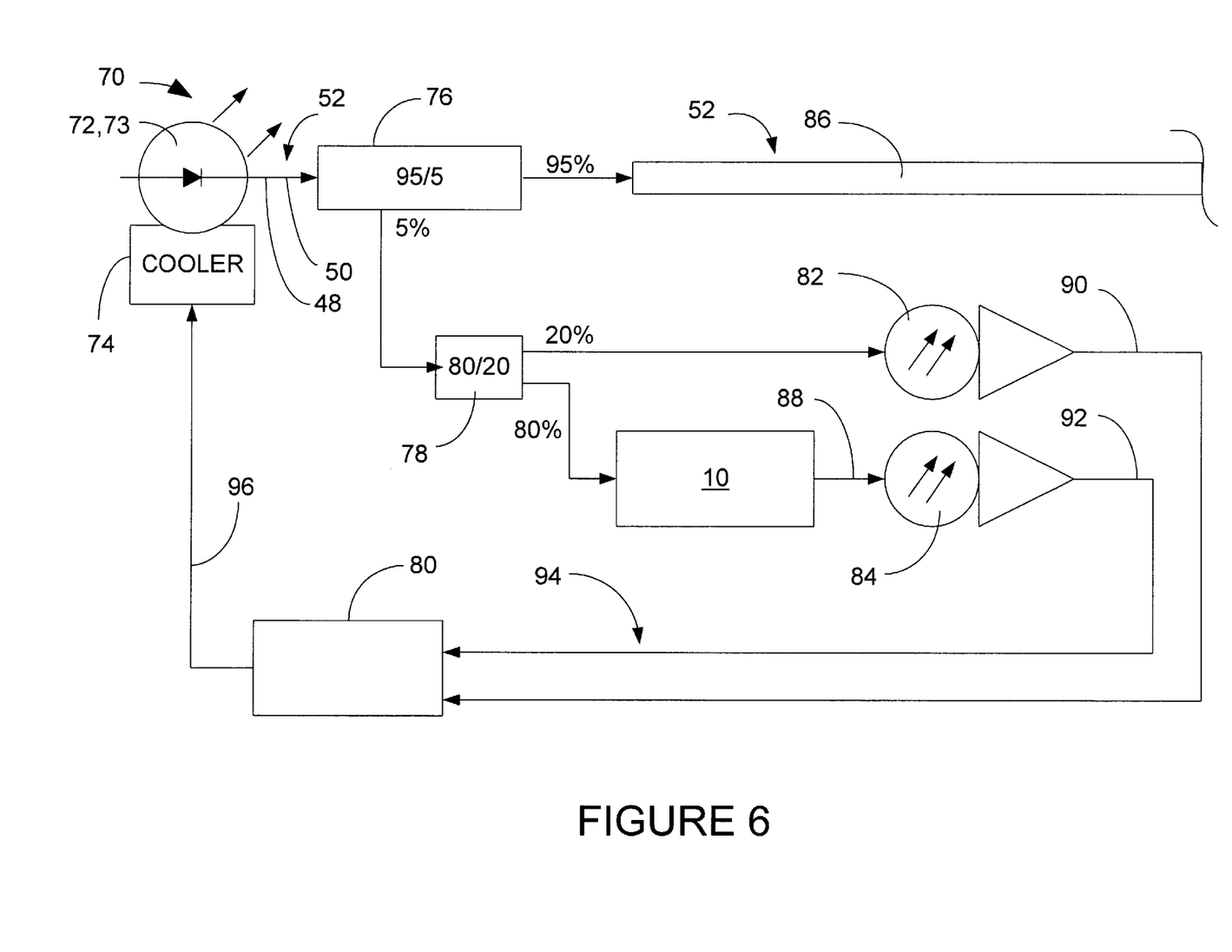
FIG. 6 shows a block diagram of gas-tuned wavelength locker of the present invention, which is used in an optical system to control drift in wavelength or frequency of a laser.

FIG. 6 shows a block diagram of gas-tuned wavelength locker 10 of the present invention, which is used in an optical system 70 to control drift in wavelength of a radiation source 72 or other optical device. The output beam 48 of the radiation source 72 which is preferably a laser diode 73, is transmitted through a fiber 50 to a first beam splitter 76, from which a small fraction, preferably around 5% is directed to a second beam splitter 78. The 95% remainder enters the main transmission line 86. The output beam 48 of each radiation source 72 creates a channel 52.

The 5% beam split from the first beam splitter 76 is further split so that 80% is directed to the wavelength locker 10, and the remaining 20% passes to a first detector 82. The output of the wavelength locker 10 is directed to a second detector 84. The output power 88 of the wavelength locker 10 will depend on the power that is output by the laser diode 73, as well as the drift in wavelength of the laser output beam. In order to compensate for the decrease in wavelength locker output 88 which is due to power fluctuations and not wavelength drift, the 20% of the beam produced by the second splitter 78 and which is measured by the first detector 82, is used as a power level reference. This reference output 90 from the first detector 82 is fed to the controller 80 along with the output 92 from the second detector 84. The wavelength drift component of the wavelength locker output 88 can thus be isolated. The controller 80 then acts to send a control signal 96 to a voltage controlled cooler 74, which heats or cools the laser-diode 73. The wavelength of the laser-diode 73 is controlled by changes in temperature, and thus is controlled to remain locked to the desired output wavelength. As is common usage in this field, the operation of compensating for fluctuations in overall power output in order to isolate the component due to shift is frequency is referred to here as "normalizing" or "normalization", and the first and second detector outputs can be considered to produce a normalized output 94.

Figure 7:
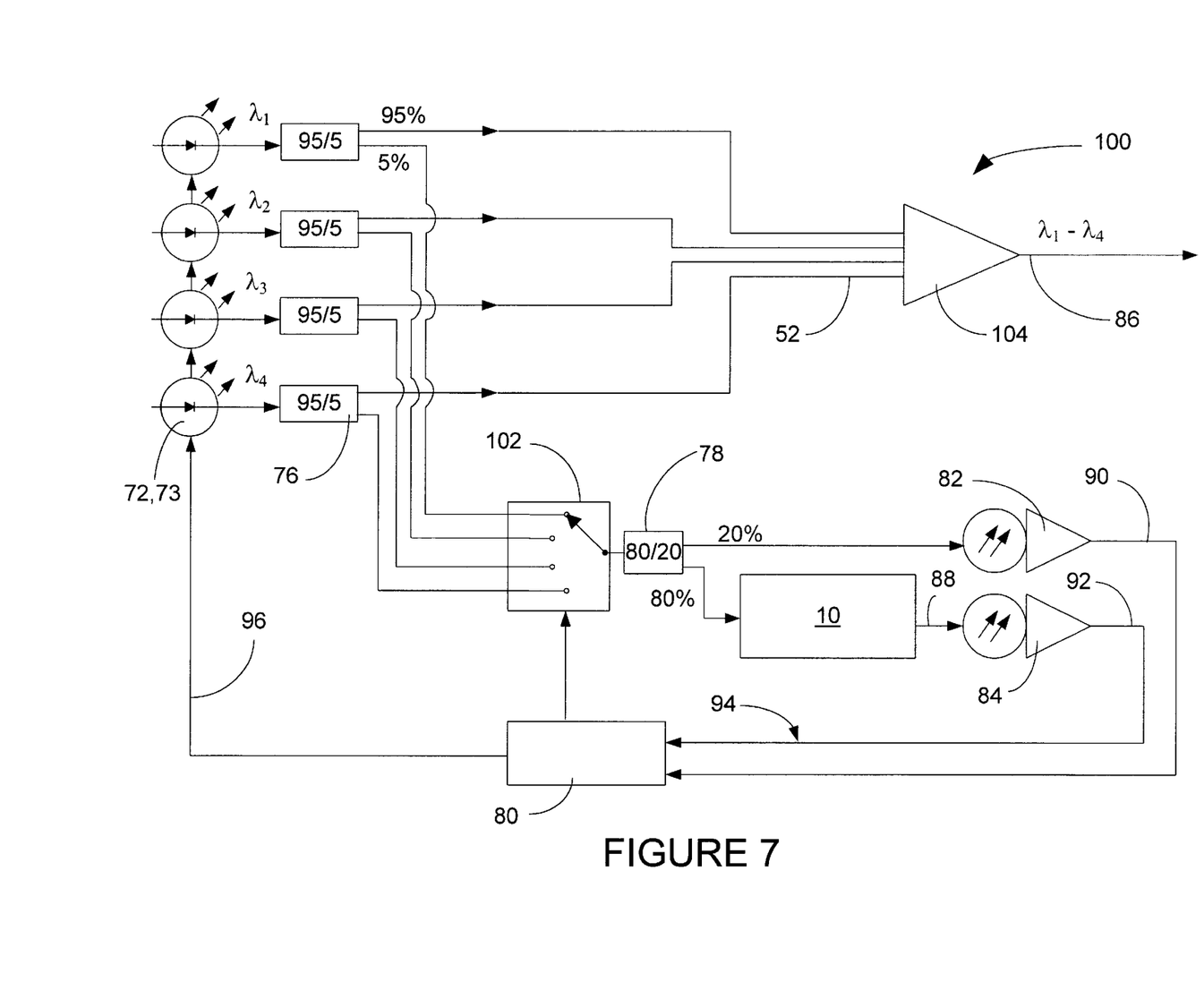
FIG. 7 shows a block diagram of a multiplexed optical system which uses a single gas-tuned wavelength locker of the present invention to control shift in wavelength or frequency of a number of lasers by using a switching system.

This basic configuration can be repeated with a number of radiation sources 72 whose outputs are then multiplexed into a main transmission line 86. FIG. 7 shows a block diagram of a multiplexed optical system 100 which uses a single gas-tuned wavelength locker of the present invention to control drift in wavelength/frequency of a number of lasers by using a switching system. The system shown includes only four channels for simplicity, but it is to be understood that in practice, the system will generally include 80 or more channels. Each of the four laser-diodes 73 produces a different wavelength which are designated as $\lambda_1$–$\lambda_4$. The outputs are again split by first and second beam splitters 76,78 with the initial 95% fraction being directed to a multiplexer 104 and then to the main transmission line 86. The 5% fraction of each laser is directed to a multi-channel switch 102. As each channel is selected, its output is directed through a second beam splitter 78, with 80% being directed to the wavelength locker 10 and detector 84 as described above. The controller 80 again serves to normalize the wavelength drift signal 92, and to control heater/coolers in each laser-diode 73. The controller 80 also serves to control the multi-channel switch 102, usually scanning through the various positions to sample each channel 52 in turn. The outputs of each of the laser-diodes 73 can thus be monitored and controlled to minimize drift of the wavelength of each.

Figure 8:
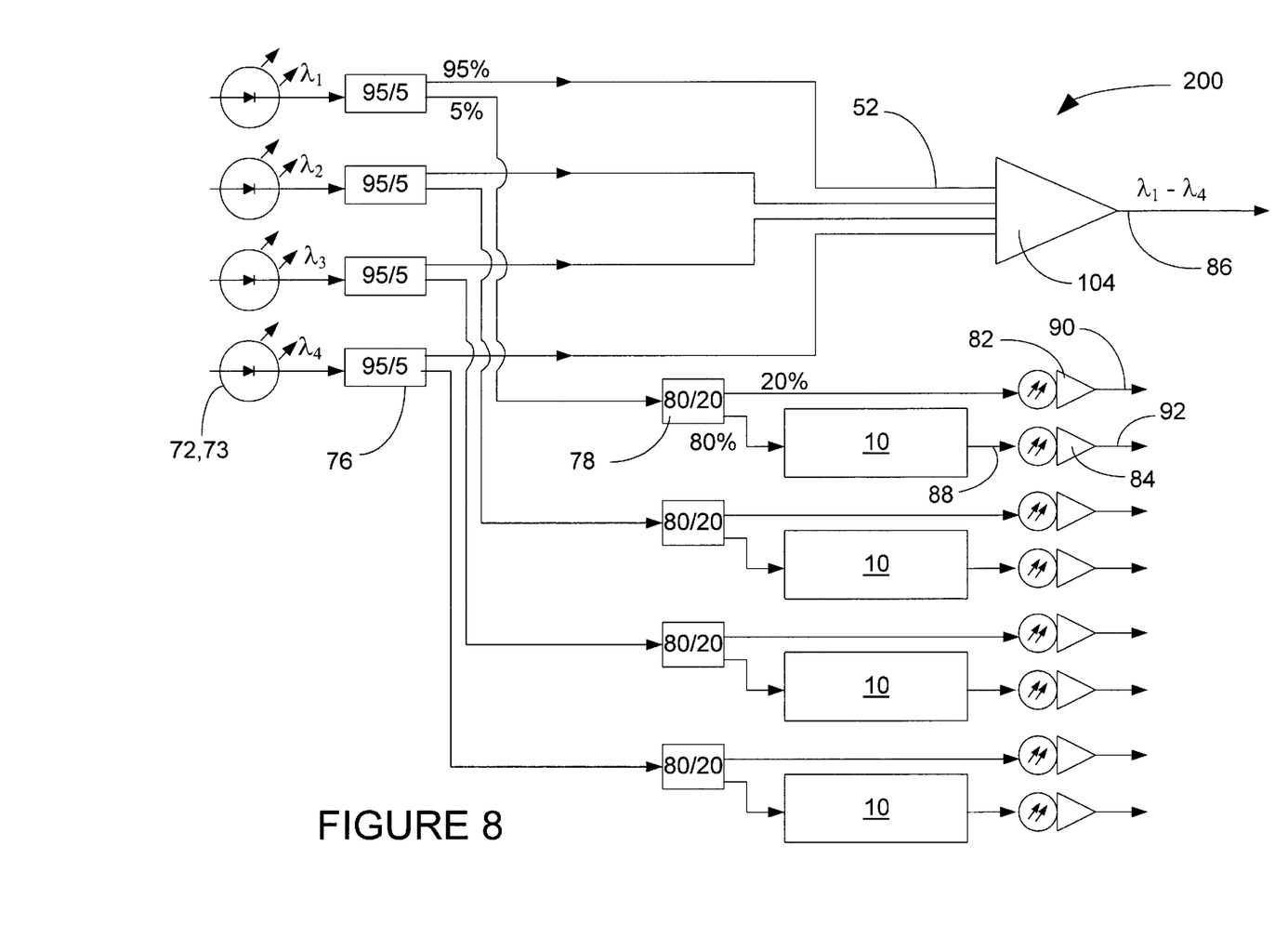
FIG. 8 shows a block diagram of a multiplexed optical system which uses multiple gas-tuned wavelength lockers of the present invention to control shift in wavelength/frequency of a number of lasers.

FIG. 8 shows a block diagram of a multiplexed optical system 200 which uses multiple gas-tuned wavelength lockers 10 of the present invention to control drift in wavelength of a number of radiation sources 72. Each of the four laser-diodes 73 produces a different wavelength which are again designated as $\lambda_1$–$\lambda_4$. As before, the outputs are again split by first and second beam splitters 76,78 with the initial 95% fraction being directed to a multiplexer 104 and then to the main transmission line 86. The remainder of the system works essentially as described above in regard to FIG. 6. The controller and heater/coolers are not shown in this view for simplicity.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

INDUSTRIAL APPLICABILITY

The present wavelength locker 10 is well suited for application in the communications industry, or any system which uses multiplexed signals which are transmitted by fiber optics networks.

Multiple optical signals of different wavelength are transmitted in the same direction over one strand of fiber, and the signals are later separated by wavelength at the distant end in Wavelength Division Multiplexing (WDM). The International Telecommunication Union (ITU) has proposed successive systems of standardized frequencies to be used as channels for optical telecommunications, the current system including 80 channels utilizing a wavelength range centered around 1550 nm (193,300 GHZ) with a channel spacing of approximately 0.4 nm (50 GHZ). There has also been a system proposed which uses channel spacing of 25 GHZ (0.2 nm). With such small separation in the spacing between channels, a multiplexed channel system is be highly sensitive to fluctuations that will cause the channel frequencies to drift away from the target grid frequencies.

The present wavelength locker 10 is able to provide accurate tuning for 25 GHz applications while allowing for much lower dimensional tolerances in the component parts. The wavelength locker includes an etalon 12, which is a Fabry-Perot interferometer 13, and generally includes an enclosure 14, which surrounds a cavity 16. This cavity 16 includes a medium 19 of variable index of refraction, which is preferably a tuned gas 18, whose pressure or composition has been tuned to produce the appropriate index of refraction. The etalon 12 includes a first reflecting surface 20, a second reflecting surface 22, top wall 24, bottom wall 26, and side walls 28 to complete a gas-tight enclosure 14. The etalon 12 is connected to a gas source 30 which provides gas of variable composition and pressure through a valve 32. The etalon 12 also includes an inlet 34, which is preferably sealable in a gas-tight manner. Incident light beams 36 approach the etalon 12 at substantially normal incidence, and are internally reflected as reflected beams 38, and interfere with the incident light beams 36 to create an interference pattern which produces spectral lines 4. The first reflecting surface 20, and second reflecting surface 22 can be spoken of as a reflecting surface pair 23. As discussed below, there may be multiple reflecting surface pairs within a single enclosure 14.

The spectral line pattern 4 can be adjusted to align with the ITU grid pattern by changing the index of refraction (n) by tuning the properties of the material within the cavity 16. Varying either the pressure or the composition of the gas in the cavity will change the index of refraction (n), thus allowing the etalon 12 to be tuned, and the spectral lines 4 aligned with the ITU grid 2.

Once the etalon 12 has been tuned, the cavity 16 is at least temporarily sealed, and the etalon 12 is then used to lock the wavelengths of a number of radiation sources 72 operating at wavelengths separated by a predetermined spacing, each spaced wavelength being a channel 52 which is connected to a multiplexer 104.

The output of each radiation source 72 which is preferably a laser diode 73, is transmitted through a fiber 50 to a first beam splitter 76, from which a small fraction, preferably around 5% is directed to a second beam splitter 78. The 95% remainder enters the main transmission line 86.

The 5% beam split from the first beam splitter 76 is further split so that preferably 80% is directed to the wavelength locker 10, and the remaining 20% passes to a first detector 82. The output of the wavelength locker 10 is directed to a second detector 84. The outputs of both detectors are compared in the controller 80. The power output of the radiation source 72 can thereby be normalized as to power fluctuations, so that the component of change due to wavelength drift can thus be isolated. The controller 80 then acts to send a control signal 96 to adjust each radiation source 72, possibly by using a voltage controlled cooler 74, which heats or cools the laser-diode 73. The wavelength/frequency of the laser-diode 73 is controlled by changes in temperature, and thus is controlled to remain locked to the desired output wavelength/frequency.

A multi-channel switch 102 can be used to scan through the various positions to sample each channel in turn. The outputs of each of the radiation source 72 can thus be monitored and controlled to minimize drift of the wavelength of each.

Alternately, multiple gas-tuned wavelength lockers 10 can be used to control drift in wavelength/frequency of a number of radiation source 72, with one wavelength locker assigned to each radiation source 72.

By using gas tuning to set the index of refraction (n), the physical tolerances on the etalon parts can be much less strict than would otherwise be necessary. In order to achieve an accuracy of 1 GHz in matching the ITU frequencies, parts would normally have to be made within a tolerance of 10 nm ($10 \times 10^{-9}$ m). Instead, by allowing the gas filler material m the cavity to be adjusted in pressure or composition, variations in the physical parts can be relaxed to tolerances of only 1 $\mu$ ($1 \times 10^{-6}$ m) thus resulting in devices which are much less expensive.

The use of 25 GHz multiplexer systems is thus much less expensive than previously possible, and its implementation much facilitated. Thus, the industrial applicability of the present invention 10 to the communications industry is great.

For the above, and other, reasons, it is expected that the wavelength locker 10 of the present invention will have widespread industrial applicability. Therefore, it is expected that the commercial utility of the present invention will be extensive and long lasting.

What is claimed is:

1. A method for locking the wavelengths of a plurality of radiation sources to a wavelength reference, comprising:

A) providing at least one etalon that is open within a surrounding enclosure and which includes a gas-tunable medium having a variable optical index of refraction;

B) introducing radiation into said etalon, whereby a plurality of equally spaced spectral lines is produced;

C) tuning said etalon by varying said variable optical index of refraction of said gas-tunable medium, to align said plurality of spectral lines with said wavelength reference;

D) fixing said variable optical index of refraction included in said etalon, so that said spectral line produced remains substantially aligned with said external reference wavelength;

E) diverting a portion of the radiation from a radiation source whose wavelength is to be locked, introducing said portion of said radiation into said etalon, whereby at least one spectral line is produced;

F) detecting said at least one spectral line output from said etalon and creating control signals therefrom in response to shifts in wavelength of said spectral line output; and G) adjusting said radiation source whose wavelength is to be locked in response to said control signals.

2. The method for locking the wavelengths of a plurality of radiation sources of claim 1, wherein:

said etalon includes a cavity which is filled with gas, and tuning of said etalon in step C is done by variation in the pressure of the gas in the cavity.

3. The method for locking the wavelengths of a plurality of radiation sources of claim 1, wherein:

said etalon includes a cavity which is filled with gas, and tuning of said etalon in step C is done by variation in the composition of the gas in the cavity.

4. The method for locking the wavelengths of a plurality of radiation sources of claim 1, wherein:

said wavelength reference is the ITU grid.

5. The method for locking the wavelengths of a plurality of radiation sources of claim 1, wherein:

said at least one etalon is at least one reflective etalon.

6. The method for locking the wavelengths of a plurality of radiation sources of claim 1, wherein:

said at least one etalon is at least one transmissive etalon.

7. The method for locking the wavelengths of a plurality of radiation sources of claim 1, wherein:

said control signals are normalized as to power fluctuations by providing a second beam splitter which diverts a second portion of the radiation to a second detector.

8. The method for locking the wavelengths of a plurality of radiation sources of claim 1, wherein:

said etalon includes a cavity which is filled with gas; and step D of fixing said variable optical index of refraction is done by hermetically sealing said enclosure.

9. The method for locking the wavelengths of a plurality of radiation sources of claim 1, wherein:

said at least one etalon include multiple reflective surface pairs within one said enclosure.

10. The method for locking the wavelengths of a plurality of radiation sources of claim 1, wherein:

said radiation sources are each separate channels, each of which is associated with a separate said etalon.

11. The method for locking the wavelengths of a plurality of radiation sources of claim 1, wherein:

said radiations sources are each separate channels, each is sequentially switched to a common said etalon.

12. A system for providing wavelength-locked multi-channels signal, comprising:

a plurality of radiation sources providing beams of radiation at wavelengths separated by a predetermined spacing, each spaced wavelength being a channel which is connected to a multiplexer;

at least one wavelength-locker producing equally-spaced spectral lines which are tuned in comparison to a wavelength reference, said wavelength-locker including at least one etalon that is open within a surrounding enclosure and which includes a gas-tunable medium having a variable optical index of refraction;

first beam splitters which divert a portion of said beams of radiation into said at least one wavelength locker;

at least one detector which receives the spectral line output of the wavelength locker, detects shifts in wavelength of said spectral line output and generates control signals; and means for adjusting the wavelength of said plurality of radiation sources in response to said control signals.

13. The system for providing wavelength-locked multi-channels signals of claim 12, wherein:

said etalon includes a cavity which is filled with gas, and tuning of said etalon is done by variation in the pressure of the gas in the cavity.

14. The system for providing wavelength-locked multi-channels signals of claim 12, wherein:

said etalon includes a cavity which is filled with gas, and tuning of said etalon is done by variation in the composition of the gas in the cavity.

15. The system for providing wavelength-locked multi-channels signals of claim 12, wherein:

said wavelength reference is the ITU grid.

16. The system for providing wavelength-locked multi-channels signals of claim 12, wherein:

said at least one etalon is at least one reflective etalon.

17. The system for providing wavelength-locked multi-channels signals of claim 12, wherein:
said at least one etalon is at least one transmissive etalon.

18. The system for providing wavelength-locked multi-channels signals of claim 12, wherein:
said control signals are normalized as to power fluctuations by providing a second beam splitter which diverts a second portion of the radiation to a second detector.

19. The system for providing wavelength-locked multi-channels signals of claim 12, wherein:
said variable optical index of refraction is continuously tunable by the user in response to drifts in the output of radiation sources.

20. The system for providing wavelength-locked multi-channels signals of claim 12, wherein:
said radiation sources are each separate channel, each of which is associated with a separate said wavelength locker.

21. The system for providing wavelength-locked multi-channels signals of claim 12, wherein:
said radiations sources are each separate channels, each is sequentially switched to a common said wavelength locker.

22. A process for making a wavelength-locked multi-channel multiplexer, comprising the steps of:
A) forming at least one etalon which includes a pair of reflecting surfaces and that is open within enclosure walls surrounding a cavity filled with gas of variable pressure and composition, and which produces a medium of variable optical index of refraction;
B) introducing radiation into said etalon, whereby a plurality of equally spaced spectral lines is produced;
C) tuning said etalon by varying said variable optical index of refraction, to align said plurality of spectral lines with said wavelength reference;
D) fixing said variable optical index of refraction included in said etalon, so that said spectral line produced remains substantially aligned with said external reference wavelength;
E) providing a plurality of radiation sources producing radiation at wavelengths separated by a predetermined spacing, each spaced wavelength being a channel which is multiplexed with the other channels;
F) introducing a portion of the outputs of said plurality of radiation sources to said at least one etalon, and producing etalon output;
G) detecting shifts in wavelength in said etalon output which are due to shifts in wavelength of said plurality of radiation sources; and
H) adjusting said plurality of radiation sources in response to shifts in wavelength of said plurality of radiation sources to lock the wavelength.

23. A wavelength-locked multiplexer produced by the process of claim 22.

24. A method for locking the wavelengths of a plurality of channels in a multi channel system, comprising:
A) providing at least one etalon that is open within a surrounding enclosure and which includes a medium having a variable optical index of refraction;
B) introducing a beam of incident light into said etalon, whereby a plurality of spectral lines is produced;
C) comparing said at least one spectral line with at least one external reference wavelength;
D) tuning said etalon by varying pressure in said etalon to adjust said variable optical index of refraction to align said spectral lines with said at least one external reference wavelength;
E) fixing said variable optical index of refraction included in said etalon, so that said spectral lines produced remain substantially aligned with said external reference wavelength;
F) detecting said spectral lines output from said etalon and creating control signals therefrom; and
G) adjusting said optical device whose wavelength is to be locked in response to said control signals.

* * * * *